April 3, 1956 A. F. HICKMAN 2,740,622
SPRING SUSPENSION FOR VEHICLES
Filed Dec. 30, 1954 3 Sheets-Sheet 1
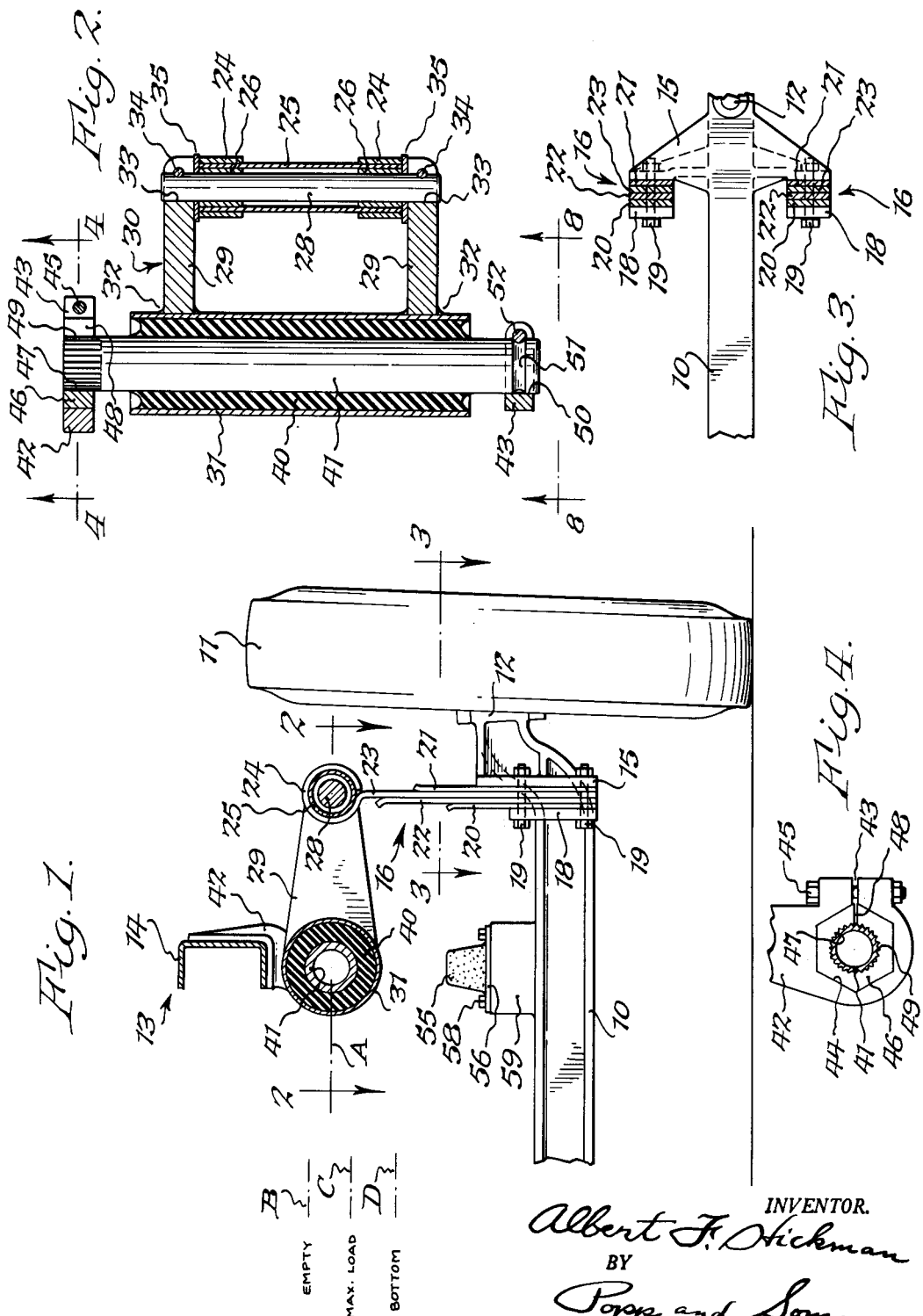
INVENTOR.
Albert F. Hickman
BY
Popp and Sommer
Attorneys.

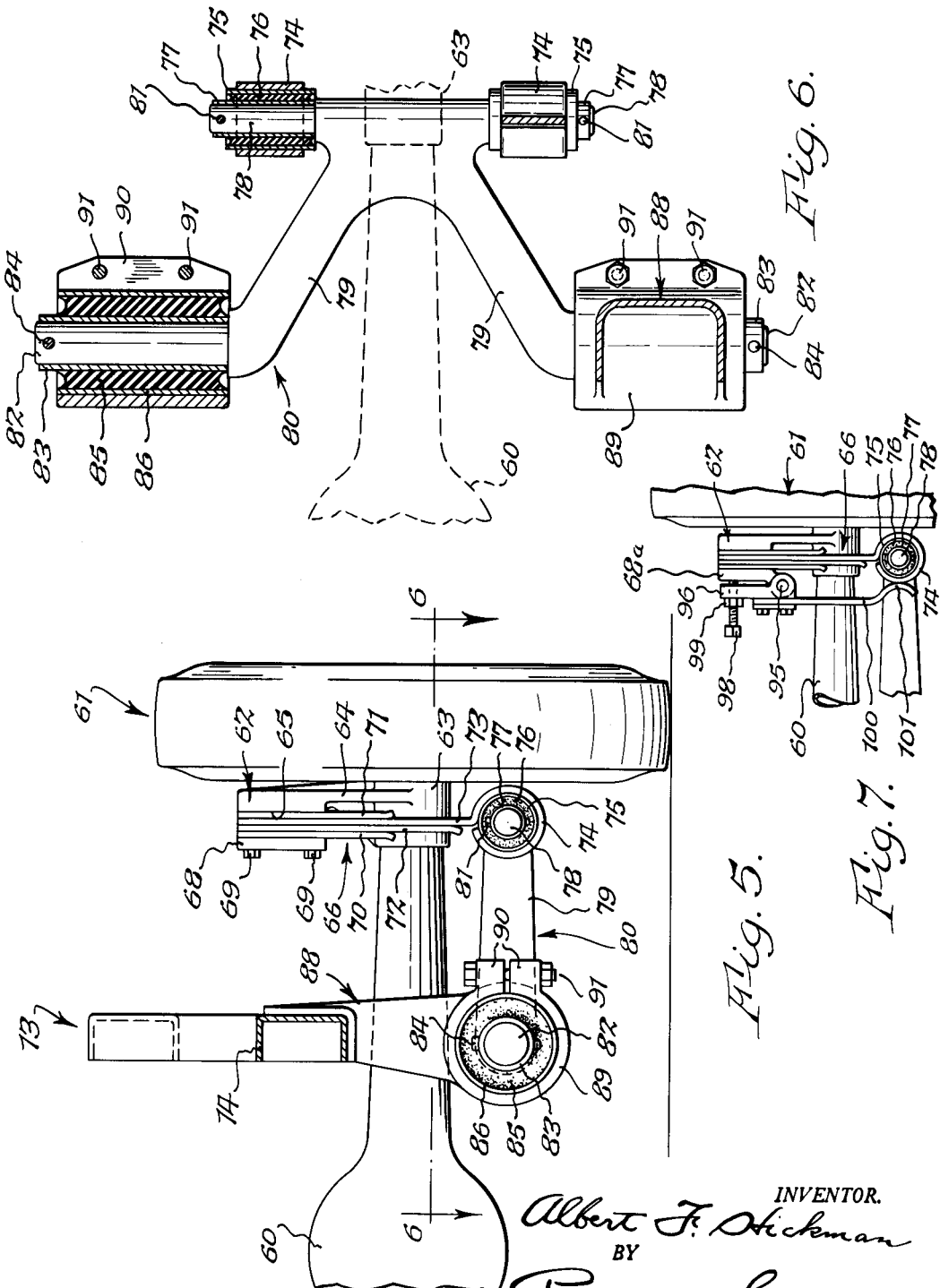

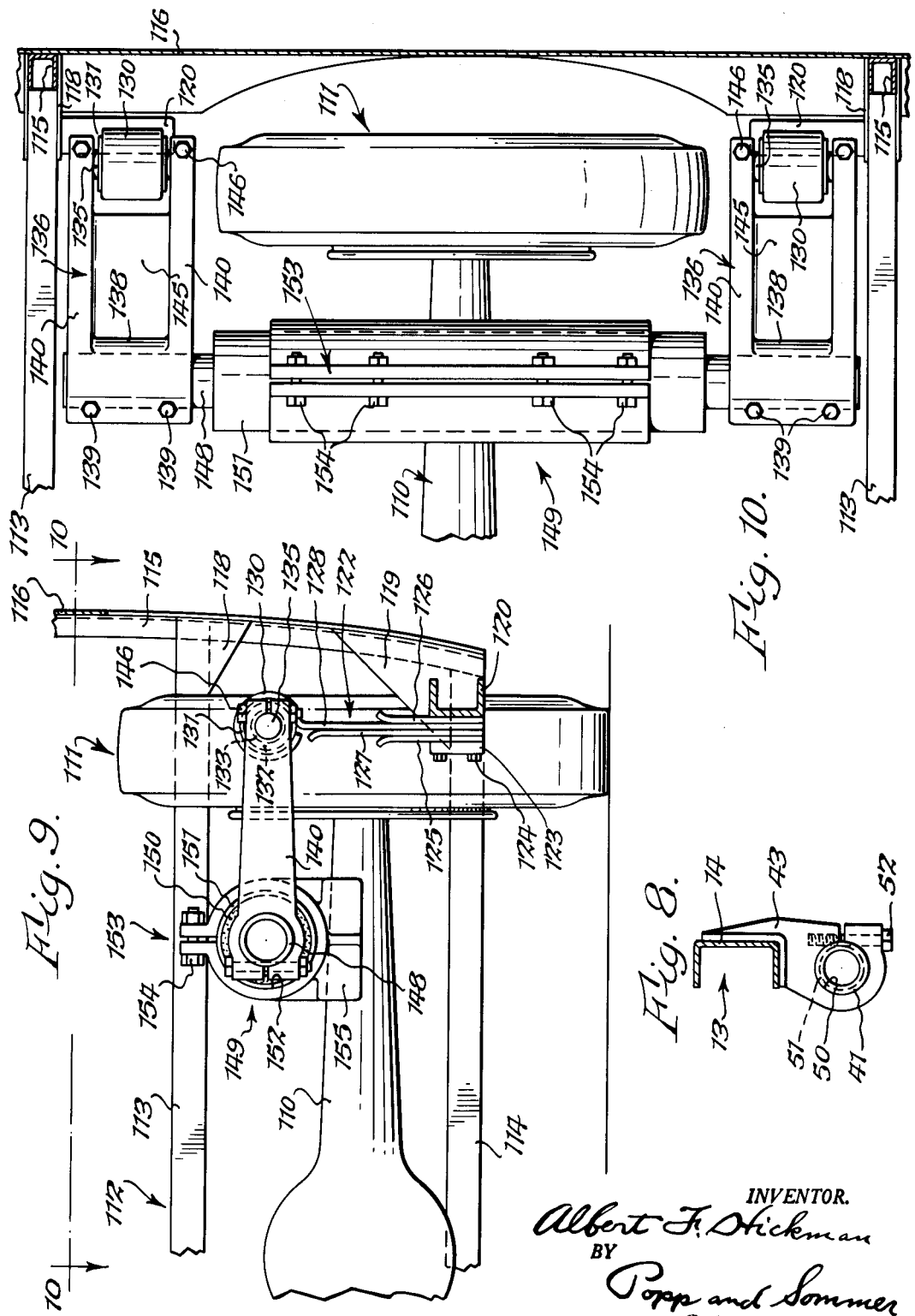

United States Patent Office 2,740,622
Patented Apr. 3, 1956

2,740,622

SPRING SUSPENSION FOR VEHICLES

Albert F. Hickman, Eden, N. Y., assignor to Hickman Industries, Inc., Eden, N. Y., a corporation of New York Application December 30, 1954, Serial No. 478,642

18 Claims. (Cl. 267—25)

This invention relates to a spring suspension for vehicles and is shown as embodied in a torsion spring type of spring suspension between the axle assemblies and the vehicle frame.

Important general objects of the present invention are to provide a spring suspension; (1) which will function to safely support the car body when loaded and unloaded; (2) which reduces and cushions both the vertical and lateral impacts from the axles against the body of the vehicle, both when the vehicle is loaded and unloaded, and without imposing undue end thrusts on the pivotal connections which connect the axles to the body; (3) in which torsion springs are employed to provide a long spring resistance range; (4) in which the distribution of the load to the body is at a plurality of spaced points; (5) in which the side sway is reduced to any desired amount; (6) in which periodic vibration of the suspension is dampened out and in which wheel tramp is avoided; (7) in which all forces are cushioned so as to increase gasoline mileage and decrease tire wear; (8) in which the suspension can have light sprung weight; (9) in which the metal stresses are within safe working limits of heat treated forgings and castings; (10) it can be produced at low cost and, in particular, requires only simple machining operations; (11) in which the parts can be arranged inside of the wheels and in which the parts are located close to the wheels to provide wide pivot positions and increased stability; (12) in which the parts can be arranged to extend in line with the wheels to provide still wider pivot positions and still greater stability; (13) which can easily be taken down and repaired; (14) in which any desired frequency and degree of spring deflection can be obtained; (15) in which auxiliary devices for the control of side sway are rendered unnecessary; and (16) which is extremely compact and will stand up under conditions of severe and constant use with very little servicing.

A specific object is to provide such a spring suspension between each axle end and a vehicle chassis of the type which includes a crank arm and shackle and in which the usual bearing at one end of the shackle is eliminated, this being effected by making the shackle in the form of a vertically elongated flat metal leaf spring which is flexible only in the direction lengthwise of the axle and has one end anchored and has its other free end connected to the free end of the crank arm.

Another specific object is to provide such a spring suspension in which the leaf spring shackle can be anchored either to the axle or to the chassis frame as conditions may dictate.

Another specific object is to provide such a spring suspension in which the leaf spring shackle can project either upwardly or downwardly from its anchored end as conditions may dictate.

Another specific object is to provide such a spring suspension in which conventional frictional or lubricated bearings can be eliminated and substituted by rubber bushings which flex to provide the required oscillatory movement.

Another object is to provide such a spring suspension which is free from undue strain from brake and drive torque reactions, this being accomplished by providing a pair of spring shackles at each axle end, one spring shackle in front and one in rear of the axle, and by providing a bifurcated crank arm pivotally connected with the spring shackle of each pair.

Another object is to provide such a spring suspension in which means can be provided for adjusting the resilient resistance of the spring shackles.

Other objects and advantages of the invention will be apparent from the following description and drawings in which:

Fig. 1 is a vertical section through a suspension embodying the present invention, the section being taken above and parallel with the supporting axle.

Fig. 2 is a generally horizontal section taken on line 2—2, Fig. 1.

Fig. 3 is a fragmentary, generally horizontal section taken on line 3—3, Fig. 1.

Fig. 4 is a fragmentary, vertical section taken on line 4—4, Fig. 2.

Fig. 5 is a vertical section through the main longitudinal side frame bar at one side of a vehicle chassis and showing in elevation a modified form of suspension embodying the present invntion.

Fig. 6 is a fragmentary horizontal section taken generally on line 6—6, Fig. 5.

Fig. 7 is a fragmentary view similar to Fig. 5 and showing a further modification of the present invention.

Fig. 8 is a fragmentary vertical section taken along line 8—8, Fig. 2 and showing a part of the suspension shown in Figs. 1–4 in elevation.

Fig. 9 is a view similar to Fig. 5 and showing a still further modified form of the invention.

Fig. 10 is a fragmentary horizontal section taken generally on line 10—10, Fig. 9.

In the form of the invention shown in Figs. 1–4 and 8, the numeral 10 designates the front or steering axle of an automobile supported at its opposite ends by steering wheels 11 and shown as connected to the axle 10 through the usual steering knuckle 12. The suspension supports an automobile chassis 13 of which one of the main longitudinal side bars 14 is shown as being in the form of a channel bar.

A pair of axle brackets 15 are forged integrally with the axle 10 at each end thereof. These axle brackets are in the form of integral vertical flanges, one flange of each bracket projecting forwardly from the axle and the other flange projecting rearwardly from the axle. To the face of each of these flanges 15 opposite from the companion wheel 11 is bolted the base or anchored end of an upstandin leaf spring shackle 16. For this purpose, each leaf spring shackle has a clamping plate 18 and each leaf spring shackle is secured by bolts 19 which pass through its clamping plate, spring leaves and its axle bracket or supporting flange 15.

Each leaf spring shackle 16 is composed of spring leaves 20, 21, 22 and 23 which are of progressively increasing length, the longest spring leaf 23 being formed at its upper end to provide a cylindrical eye 24. It will be noted that the shortest spring leaf 20 and the second longest spring leaf 22 are arranged on the side of the main or longest spring leaf 23 facing the center of the chassis 13 so that substantially greater resistance is provided, at each side of the vehicle, to flexure of each upstanding leaf spring shackle toward the center of the automobile chassis, then outwardly or toward the companion wheel 11.

The spring leaf eyes 24 at each end of the axle 10 jointly embrace and are fast to a tube 25 which extends horizontally crosswise of the axle 10 and is provided with bearing bushings 26 at its opposite ends. These bearing bushings can be of any material, but for long life and freedom from lubrication requirements, are preferably made of sintered metal impregnated with a lubricant. A crank arm pivot pin 28 is journalled in each pair of the bearings 26 and has its opposite ends projecting from the tube 25. To each of these projecting ends is fixed the outer end of a corresponding crank arm 29 of a bifurcated or two arm crank arm structure 30.

This bifurcated crank arm structure is shown as comprising a large tube 31 to which the inner or fulcrum ends of the two crank arms 29 are welded, as indicated at 32, and the crank arm pins 28 can be each mounted in a recess 33 provided in the end of the corresponding crank arm 29 and held against turning therein by a pin 34. Preferably, thrust washers 35 are interposed between the ends of the tube 25 and the opposing inner faces of the two crank arms 29.

The tube 31 of the crank arm structure 30 is part of a torsion spring and for this purpose has vulcanized to its bore a cylindrical body 40 of rubber. A fulcrum rod 41 extends axially through and has its periphery vulcanized to this body 40 of rubber and this fulcrum rod 41 is fixed to the chassis 13 of the automobile. For this purpose, a pair of frame brackets 42 and 43 are provided at opposite ends of the fulcrum rod 41 (see Figs. 2, 4 and 8). Each of these brackets has an upper part which is fast to the corresponding frame side bar 14 and the lower part of the bracket 42 is split, as indicated at 43, the opposite sides of this split 43 forming a hexagonal recess 44 and these opposite sides are drawn together by a clamping bolt 45 against a hexagonal insert 46 in the hexagonal recess 44. This hexagonal insert 46 is provided with a splined through bore 47 and this insert is also split at one side, as indicated at 48, to provide a continuation of the split 43 of the frame bracket 42. One end of the fulcrum rod 41 is splined, as indicated at 49, to fit into the splines 46 of the hexagonal insert 45.

The opposite bracket 43 as shown in Fig. 8 is split to provide a horizontal recess 50 provided at its lower end in which the opposite end of the fulcrum rod 41 is fitted as best shown in Fig. 8. It is preferable that this opposite end of the fulcrum rod 41 be provided with an annular groove 51 of rounding cross section and the round shank of a bolt 52 fits in this groove 51, this bolt 52 being mounted in the lower end of the bracket 43 to bridge the split or recess 50.

A rubber bumper 55 is provided to act as a bottoming bumper for the suspension. For this purpose, the bumper 55 is shown as being in the form of a rubber block vulcanized to a base plate 56 which in turn is shown as being secured by screws 58 to a base 59 which latter is welded to the upper side of the axle 10 immediately below the tube 31. It will be seen that under extreme impact conditions, the tube 31 can bottom against the rubber bumper 55.

A horizontal dot-dash line A is shown as being horizontally in line with the moving axis of the fulcrum rod 41, this line being related to the dot-dash lines B, C and D. When the vehicle is empty, the chassis 13 is at its maximum elevation with reference to the axle 10 and the line A is in line with the line B.

Under normal light load conditions, the bifurcated crank arm structure 30 is horizontally disposed as shown in Fig. 1 and the line A is between lines B and C.

Under maximum load conditions, the chassis 13 is depressed so that the line A is in line with the line C and when the suspension bottoms, the line A comes into alignment with the line D.

When under the normal light load condition, illustrated in Fig. 1 and with the crank arm structure 30 horizontal, when the wheel 11 strikes a bump in the road, the wheel and axle 10 are of course, driven upwardly. This causes the upstanding spring shackle 16 to drive the crank arm pivot pins 28 upwardly thereby to swing the outer ends of the two crank arms 29 of the bifurcated crank arm structure 30 upwardly about the fulcrum rod 41. In the movement, the upstanding leaf spring shackle 16 is required to flex, this flexure being toward the center of a chassis 13 and being resisted by the longest leaf 23, the shortest leaf 20 and the second longest spring leaf 22.

As the pair of crank arms 29 swing upwardly, they rotate their common tube 31 counterclockwise as viewed in Fig. 1 thereby to stress the cylindrical rubber body 40 the core of which is formed by the fulcrum rod 41 which is fixed to the chassis 13.

When the chassis 13 moves upwardly from the position shown in Fig. 1, due to rebound movement of the chassis, the pair of crank arms 29 swing downwardly about the axis of the fulcrum rod 41 and it will be noted that this again moves the leaf spring shackle 16 toward the center of the chassis 13 and against the resistance of the two leaf springs 20 and 22. In both such upward and downward movement of the chassis 13 relative to the axle 14, the rubber body 40 acts substantially as a constant rate torsion spring.

The form of the invention shown in Figs. 5 and 6 differs from the form of the invention shown in Figs. 1–4 and 8 essentially in that the leaf spring shackle projects downwardly, rather than upwardly, from the axle so that the entire suspension can be disposed at a lower elevation. It is shown as used in conjunction with a rear or drive axle 60 which is shown as having the usual differential gear housing and is shown as being supported at its opposite ends by drive wheels 61. The suspension supports the automobile chassis 13 of which the main longitudinal side bar is designated at 14.

An axle bracket 62 is secured to each end of the axle 60. Each of these axle brackets 62 includes a hub 63 embracing the axle 60 and a pair of upwardly divergent arms 64. These arms of each axle bracket diverge forwardly and rearwardly crosswise of the axle and each arm is formed with a flat face 65 on the side remote from the wheel 61. To each of these flat faces is bolted a leaf spring shackle 66 which projects downwardly, the spring shackles at each end of the axle 60 being arranged on opposite sides of the axle. To secure each leaf spring shackle 66 to the arm 64, each leaf spring shackle has a clamping plate 68 and each leaf spring shackle is secured by screws 69 which pass through its clamping plate spring leaves and anchor in the arms 64 of the axle bracket 62.

Each leaf spring shackle 66 is composed of spring leaves 70, 71, 72 and 73 which have different lengths. It will be noted that two of these spring leaves 70 and 72 are arranged on the side of the main or long spring leaf 73 which is remote from the companion wheel 61 so that, at each side of the vehicle, substantially greater resistance is provided to the flexure of each leaf spring shackle toward the center of the automobile chassis than outwardly or toward the companion wheel 61. The longest or main spring leaf 73 is formed at its lower extremity to provide a cylindrical eye 74, these cylindrical eyes at each axle end being axially in line with each other.

The spring leaf eyes 74 at each end of the axle 60 severally embrace and are fast to a tube 75 to the interior of which is vulcanized a body 76 of rubber or other soft resilient plastic material. Each of these cylindrical rubber bodies is in turn vulcanized to the periphery of a metal sleeve 77 and which is secured to a companion crank arm pivot pin 78. The companion pair of crank arm pivot pins 78 are formed integrally with the common outer or free ends of crank arms 79 of a bifurcated crank arm structure 80 and each sleeve 77 is shown as secured to its crank arm pivot pin 79 by a cross pin 81. The bifurcated crank arm structure 80 is shown as being formed to provide a pair of spaced fulcrum pivot pins 82 which are arranged parallel with the crank arm pivot pins 78 but are preferably spaced further apart than the crank arm pivot pins 78. A tube 83 is fitted over each of the fulcrum pivot pins 82 and secured thereto by a cross pin 84. To the periphery of each sleeve 83 is vulcanized a cylindrical rubber body 85 and the periphery of the cylindrical rubber body 85 is vulcanized to the interior of a metal tube 86.

Each of these tubes 86 is fixed to the chassis 13 of the automobile. For this purpose a pair of frame brackets 88 are secured to the main longitudinal side frame bar 14 at each end of the axle 60 and project downwardly and are arranged on opposite sides of the axle. The lower part of each of these axle brackets is in the form of a split cylinder 89 which embraces the corresponding sleeves 86 and the jaws 90 of each split cylinder 89 are drawn together into compressive relation to the sleeve 86 by a clamping screw 91.

It will be seen that the operation of the form of the invention shown in Figs. 5 and 6 is essentially the same as that described with reference to those shown in Figs. 1–4 and 8 except that since each leaf spring shackle 66 projects downwardly the bifurcated crank arm structure 80 can be arranged below the axle 60, as shown in Figs. 5 and 6 instead of above the axle 10 as shown in Figs. 1–4 and 8. Also instead of an oil impregnated bearing 26 for each crank arm pivot pin 28, as shown in Figs. 1–4 and 8, rubber bushings 76 are provided for this purpose in the form of the invention shown in Figs. 5 and 6. This is permitted because of the relatively small amount of angular movement of the crank arm pivot pins with reference to the cylindrical eyes of the leaf spring shackles in which they are journalled.

The form of the invention shown in Fig. 7 is identical with the form of the invention shown in Figs. 5 and 6 except that the clamping plate 68a which secures the spring leaves of the leaf spring shackle carries a pair of pivot pins 95 on which is journalled an adjustable hinge leaf 96. The pins 95 are shown as carried at the lower end of the clamping plate 68a and the hinge leaf 96 as projecting upwardly therefrom. An adjusting screw 98 is shown as extending horizontally through a threaded hole in the upper end of the hinge leaf 96 against the clamping plate 68a so that upon turning this adjusting screw the angular relation between the spring leaf 96 and the clamping plate 68a can be varied. The desired adjustment can be maintained by a locknut 99. A leaf spring 100 is shown as bolted to the hinge leaf 96 and as extending downwardly therefrom. The lower end 101 of this hinge leaf is shown as being rounded and as engaging the corresponding cylindrical eye 74 of the companion spring leaf shackle 66. Since in other respects the form of the invention shown in Fig. 7 is identical with that shown in Figs. 5 and 6, the same reference numerals have been employed and the description of these parts will not be repeated.

It will be seen that the operation of the form of the invention shown in Fig. 7 is substantially identical with the operation of the forms of the invention shown in Figs. 1–6 and 8 except that the amount of resistance of each spring shackle lengthwise of the axle can be adjusted thereby to adjust the degree of lateral cushioning which the suspension provides for movement of the chassis 13 longitudinally of the axle. This adjustment is achieved of course, by turning the adjusting screw 98 and setting such adjustment with the locknut 99, this adjustment varying the pressure of the spring leaves 100 against the cylindrical eyes 74 of the leaf spring shackles 66 thereby to vary the amount of resilient resistance which these leaf springs 100 add to the leaf spring shackles 66.

It is also apparent that the suspension as illustrated in Figs. 1–8 could be reversed and that instead of mounting the rubber torsion springs on the chassis or body it is possible to mount these rubber torsion springs on the opposite ends of each axle and to connect these rubber torsion springs through a crank arm and leaf spring shackle, the latter being mounted on the vehicle frame or chassis. Such a modification of the invention is illustrated in Figs. 9 and 10 and which particularly illustrate the applicability of the invention to a passenger bus.

In the form of the invention shown in Figs. 9 and 10, the suspension at one end of the rear or drive axle 110 is shown, this axle being shown as having the usual differential gear housing and as having wheels at its opposite ends and indicated generally at 111. The frame or chassis 112 of the bus is shown as including upper and lower transverse members 113, 114, vertical members 115, a sheet metal shell 116 and reinforcing gussets 118, 119. Adjacent the juncture of each transverse bar 114 with the vertical bar 115 and the connecting gusset 119, a short channel bar 120 is welded to project horizontally toward the corresponding wheel 111. These short channel bars form frame brackets which aline with each other and each of which carries an upstanding leaf spring shackle 122. To secure each leaf spring shackle 122 to the frame bracket 120, each leaf spring shackle has a clamping plate 123 and each leaf spring shackle is secured by screws 124 which pass through its clamping plate and spring leaves and anchor in the corresponding frame bracket 120.

Each leaf spring shackle 122 is composed of spring leaves 125, 126, 127 and 128 which have different lengths. It will be noted that two of these spring leaves 125 and 127 are arranged on the side of the main or long spring leaf 128 which is toward the center of the frame or chassis so that at each side of the vehicle substantially greater resistance is provided to the flexure of each leaf spring shackle toward the center of the chassis than outwardly. The longest or main spring leaf 128 is formed at its upper extremity to provide a cylindrical eye 130, these cylindrical eyes at each axle end being axially in line with each other.

Each spring leaf eye 130 is shown as embracing and fast to a tube 131 to the interior of which a cylindrical body 132 of rubber can be vulcanized. Each of these rubber bodies can be in turn vulcanized to the periphery of a metal sleeve 133 and which is secured to a crank arm pivot pin 135. Each crank arm pivot pin has its opposite ends secured in a bifurcated crank arm structure indicated generally at 136. Each of these bifurcated crank arm structures is shown as including a split hub 138, the sides of which are drawn together by clamping bolts 139 and a pair of arms 140 connected at their inner ends by a web 145 and each having its outer ends split and formed to receive the corresponding end of the crank arm pivot pin 135. The pivot pins 135 are clamped in the split ends of the arms 140 by means of bolts 146.

The split hubs of the crank arm structure 136 at each axle end are clamped to the opposite ends of a fulcrum tube or rod 148. This fulcrum rod or tube 148 forms the core of a large rubber torsion spring 149 and which is mounted on the corresponding end of the axle 110. The periphery of each axle rod is vulcanized within a cylindrical rubber body 150, the periphery of which is in turn vulcanized to a large tube 151. This tube is clamped in the bore 152 of a split axle bracket 153 the jaws or sides of which are drawn into firm engagement with the tube 152 by clamping bolts 154. The axle bracket 153 is also provided with a saddle 155 which fits upon and is welded to the corresponding end of the axle 110.

It will be seen that the operation of the form of the invention shown in Figs. 8 and 9 is substantially identical with the action of the suspension as illustrated in the preceding figures, this modification essentially illustrating the manner in which the main rubber torsion springs can be mounted on the axles and connected through leaf spring shackles anchored to the frame or chassis of the vehicle.

From the foregoing, it will be seen that all forms of the invention provide a suspension for connecting each end of a wheeled axle member with an adjacent frame member of the vehicle chassis and comprising a vertically elongated flat metal leaf spring body having an anchoring end and a free end arranged one above the other together with screws arranged to fix this anchoring end to one of these members to project generally vertically therefrom with its flat faces extending transversely of the axle whereby this leaf spring is relatively flexible in a horizontal direction lengthwise of the axle but is relatively inflexible in a vertical direction and also in a horizontal direction crosswise of the axle, and the suspension also having a normally generally horizontal crank arm fulcrumed on the other member to swing about a generally horizontal fulcrum axis extending crosswise of the axle, a means connecting the free ends of the crank arm and leaf spring body, and means yieldingly resisting movement of the vehicle chassis toward the axle member.

I claim:

1. A vehicle spring suspension for connecting each end of a wheeled axle member with an adjacent frame member of the vehicle chassis, comprising a vertically elongated flat metal leaf spring body having an anchoring end and a free end arranged one above the other, means arranged to fix said anchoring end to one of said members to project generally vertically therefrom with its flat faces extending transversely of said axle whereby said leaf spring body is relatively flexible in a horizontal direction lengthwise of said axle but is relatively inflexible in a vertical direction and also in a horizontal direction crosswise of said axle, a normally generally horizontal crank arm fulcrumed on the other of said members to swing about a generally horizontal fulcrum axis extending crosswise of said axle, means connecting the free ends of crank arm and leaf spring body, and means yieldingly resisting movement of said vehicle chassis toward said axle member.

2. A vehicle spring suspension as set forth in claim 1 wherein said free end of said metal leaf spring body is formed to provide a cylindrical eye the axis of which extends horizontally transversely of the axle member, and wherein a pin at the free end of said crank arm is journalled in said eye.

3. A vehicle spring suspension as set forth in claim 2 wherein a rubber bushing is arranged in said eye and supports said pin and wherein the oscillation of said pin in said eye flexes said rubber bushing.

4. A vehicle spring suspension as set forth in claim 1 wherein said leaf spring body is flanked by vertically elongated auxiliary flat metal spring leaves in face-to-face relation and each anchored at one end to said one of said members and extending part way along said leaf spring body to resist flexure of said leaf spring body.

5. A vehicle spring suspension as set forth in claim 4 wherein said fulcrum axis of said crank arm is arranged at the side of said leaf spring body facing the center of said chassis, and wherein said auxiliary spring leaves are provided in greater number at the side of said leaf spring body facing the center of the chassis.

6. A vehicle spring suspension as set forth in claim 1 wherein said fulcrum axis of said crank arm is arranged at the side of said leaf spring body facing the center of said chassis.

7. A vehicle spring suspension as set forth in claim 6 wherein an auxiliary spring leaf is arranged at the side of the leaf spring body facing the center of said chassis, and wherein means are provided for adjustably varying the pressure exerted by said auxiliary spring leaf against said leaf spring body.

8. A vehicle spring suspension as set forth in claim 1 wherein the fulcrum mounting for said crank arm includes a tube fast to the corresponding end of said crank arm, and a fulcrum pivot pin on which said tube is journalled and which is fast to said other of said members.

9. A vehicle spring suspension as set forth in claim 8 wherein said means yieldingly resisting movement of said vehicle chassis toward said axle member comprises a tubular body of rubber which is arranged inside and is fast to said tube and surrounds and is fast to said fulcrum pivot pin.

10. A vehicle spring suspension as set forth in claim 1 wherein a pair of said leaf spring bodies are provided at each end of said axle member, the leaf spring members of each pair being arranged, respectively, in rear of and in advance of said axle member.

11. A vehicle spring suspension as set forth in claim 10 wherein said free end of said crank arm is pivoted to the free ends of said pair of said leaf spring members to swing about a generally horizontal axis arranged crosswise of said axle member.

12. A vehicle spring suspension as set forth in claim 10 wherein said free end of said crank arm is bifurcated and provided with generally horizontal coaxial crank arm pivot pins arranged crosswise of said axle member and wherein said free ends of said pair of leaf spring bodies are each formed to provide a cylindrical eye in which the corresponding crank arm pivot pin is journalled.

13. A vehicle spring suspension as set forth in claim 12 wherein a rubber bushing is arranged in each of said eyes and wherein the oscillation of said crank arm pivot pins flexes said rubber bushings.

14. A vehicle spring suspension as set forth in claim 1 wherein said one of said members is said axle member.

15. A vehicle spring suspension as set forth in claim 1 wherein said one of said members is said axle member and wherein said leaf spring body projects upwardly from its anchoring ends so that its upper end constitutes its said free end.

16. A vehicle spring suspension as set forth in claim 1 wherein said one of said members is said axle member and wherein said leaf spring body projects downwardly from its anchoring end so that its lower end consitutes its said free end.

17. A vehicle spring suspension as set forth in claim 1 wherein said one of said member is said frame member.

18. A vehicle spring suspension as set forth in claim 1 wherein said one of said members is said frame member and wherein said leaf spring body projects upwardly from its anchoring end so that its upper end constitutes its said free end.

References Cited in the file of this patent

UNITED STATES PATENTS

| 1,261,090 | Zisterer | Apr. 2, 1918 |
| 1,747,780 | Lemaigre | Feb. 18, 1930 |
| 2,345,201 | Krotz | Mar. 28, 1944 |